E. B. STIMPSON.
ANTISKIDDING DEVICE.
APPLICATION FILED DEC. 1, 1906.
PATENTED JUNE 9, 1908.
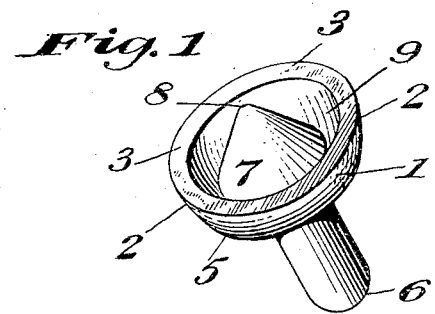
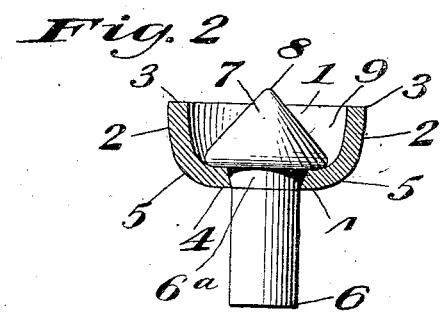
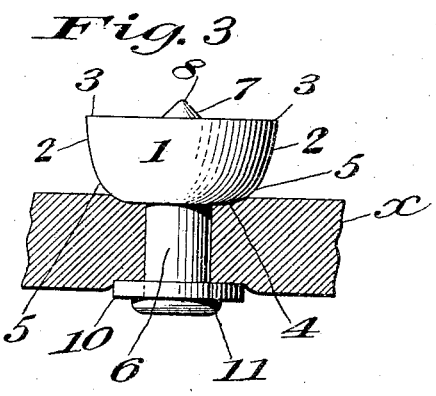
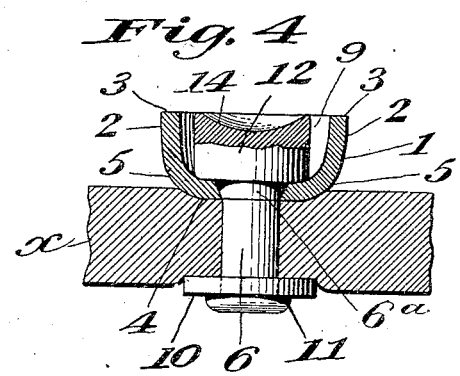
Witnesses:
Inventor
Edwin B. Stimpson
By his Attorney
THE NORRIS PETERS CO., WASHINGTON, D. C.

UNITED STATES PATENT OFFICE.

EDWIN BALL STIMPSON, OF NEW YORK, N. Y., ASSIGNOR TO EDWIN B. STIMPSON COMPANY, A CORPORATION OF NEW YORK.

ANTISKIDDING DEVICE.

No. 890,191.        Specification of Letters Patent.        Patented June 9, 1908.

Application filed December 1, 1906. Serial No. 345,901.

*To all whom it may concern:*

Be it known that I, EDWIN BALL STIMPSON, a citizen of the United States, residing in the borough of Brooklyn, county of Kings, city and State of New York, have invented certain new and useful Improvements in Antiskidding Devices, of which the following is a specification.

The object of the present invention is an improved rivet for tires, a plurality of which are adapted to be inserted thereon in road-contacting position to prevent slipping and skidding by taking firmer hold on the road.

One of the forms which the rivets of my present invention may take is shown in the accompanying drawings, wherein Figure 1 is a perspective view showing a rivet embodying my improvements; Fig. 2 is a sectional elevation taken centrally through the head of the rivet with the shank shown in side elevation; Fig. 3 is a side elevation of the same rivet shown set in a piece of material, the latter being in section; and Fig. 4 is a view similar to Fig. 3 except that the rivet head is in section to reveal a modified form of shank head which latter is partly in section and partly in elevation.

The herein described rivet comprises a head and shank, the latter projecting centrally from the bottom of the head. 1 designates the head of the rivet, and 6 the shank. The head in the particular form shown consists of a cup-like member having a hole through its bottom through which projects the shank. The hole may taper as shown, being wider above than below, and the shank may taper correspondingly at its portion 6ª located within the hole. The shank may have a head retained within the cup, which head may take a variety of forms such as the conical form 7 with projecting point 8, or the cylindrical form 12. In the latter case the shank head itself may be cupped-out as at 14.

The rivet may be set in the tire by inserting its shank through the tire material X and riveting its free end 11 against a washer 10 located on the underside of the tire material. It will of course be understood that the road-contacting portion of the rivet is the top of its head, presenting in the particular form shown cup-like edges 3 especially effective in gripping the road.

It will be noted that the head of the improved rivet comprises sides 2 adapted to project high above the tire material when the rivet is set in said material; a bottom 4; and a peripheral portion 5 by which is meant that portion where the periphery of the head works against the tire material and which everywhere around the head has a long, rounding, non-abrupt profile connecting the bottom and sides of the head.

These features combine to give the following practical advantages in the actual running of the rivet on a tire.

First: The rivet head does not sink into the tire appreciably further than the original cup-like depression made in the surface of the tire material due to the pressure thereon when the rivet is originally set.

Second: The nature of the peripheral portion of the head prevents the head from cutting the tire material.

Third: These features combined with the sides of the rivet-head cause said head to ride at all times buoyantly on the tire with the maximum practical amount of protruding metal to be worn down before the tire material is reached. In other words the tire remains protected for a maximum period.

Fourth. The rivet once tight on the tire remains so. In other words a rivet of any construction can of course be riveted tight on a tire, but will not necessarily remain so during use, because if the rivet head is of a non-buoyant variety, or tends to eat its way through the tire, it will naturally soon become loose in the tire material. This is not the case with the present rivet because riding as it does at all times buoyantly and without sinking or cutting, throughout the entire wearing down of the projecting metal of its head, the rivet remains tight on the tire to the same practical extent as when first riveted.

In the drawings 9 designates an annular space separating the head of the shank from the interior of the cup.

Preferably the head of the improved rivet will be made of hardened steel leaving the shank soft to adapt it for riveting.

The present invention excludes rivets cutting and sinking through the tire material, such as rivets having heads with a peripheral portion working against the tire material characterized by a short, abruptly rounded profile such as possessed by rivets which have been tumbled to round a peripheral portion consisting of a sharp right-angle.

Having thus described my invention, what I claim is:

An anti-skidding rivet for tires comprising a head and shank, the shank projecting from the bottom of said head, and the head having sides adapted to project high above the tire-material when the rivet is set in said material, said head being adapted to ride buoyantly in set-position on the tire-material without cutting, and having for this purpose a bottom extending laterally from the shank on all sides, and a peripheral portion being that portion where the periphery of the head works against the tire-material, and which everywhere around the head has a long, rounding, non-abrupt profile connecting the bottom and sides of the head.

In witness whereof I have hereunto signed my name this 30th day of November 1906, in the presence of two subscribing witnesses.

EDWIN BALL STIMPSON.

Witnesses:
WILLIAM J. FIRTH,
H. G. HOSE.